US009532051B2

(12) United States Patent
Yu et al.

(10) Patent No.: US 9,532,051 B2
(45) Date of Patent: Dec. 27, 2016

(54) ARCHITECTURE FOR HYBRID VIDEO CODEC

(71) Applicant: Futurewei Technologies, Inc., Plano, TX (US)

(72) Inventors: Haoping Yu, Carmel, IN (US); Wen Gao, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 518 days.

(21) Appl. No.: 14/045,973

(22) Filed: Oct. 4, 2013

(65) Prior Publication Data

US 2014/0098861 A1   Apr. 10, 2014

Related U.S. Application Data

(60) Provisional application No. 61/710,620, filed on Oct. 5, 2012.

(51) Int. Cl.
| | | |
|---|---|---|
| H04N 7/12 | (2006.01) | |
| H04N 11/02 | (2006.01) | |
| H04N 11/04 | (2006.01) | |
| H04N 19/61 | (2014.01) | |
| H04N 19/18 | (2014.01) | |
| H04N 19/48 | (2014.01) | |

(52) U.S. Cl.
CPC ........ *H04N 19/00781* (2013.01); *H04N 19/18* (2014.11); *H04N 19/48* (2014.11); *H04N 19/61* (2014.11); *H04N 19/619* (2014.11)

(58) Field of Classification Search
CPC .. H04N 19/00781; H04N 19/18; H04N 19/48; H04N 19/61; H04N 19/619

USPC ........................................ 375/240.01–240.29
See application file for complete search history.

(56) References Cited

U.S. PATENT DOCUMENTS

| | | | | |
|---|---|---|---|---|
| 2004/0114684 A1* | 6/2004 | Karczewicz | ..... | H04N 21/23424 375/240.03 |
| 2007/0263728 A1* | 11/2007 | Yanagihara | ............ | H04N 19/56 375/240.24 |

(Continued)

FOREIGN PATENT DOCUMENTS

EP    1585060 A1    10/2005

OTHER PUBLICATIONS

"Information Technology—Coding of Audio-Visual Objects—Part 2: Visual," International Standard, ISO/IEC 14496-2, Second Edition Dec. 1, 2001, 536 pages.

(Continued)

*Primary Examiner* — Mehrdad Dastouri
*Assistant Examiner* — Jared Walker
(74) *Attorney, Agent, or Firm* — Conley Rose, P.C.

(57) ABSTRACT

A method for video encoding comprising transforming a plurality of pixels to generate a first plurality of transform coefficients, quantizing the first plurality of transform coefficients to generate a plurality of quantized transform coefficients, computing a plurality of prediction pixels based on a plurality of reconstructed pixels which are prediction references for the plurality of pixels, transforming the plurality of prediction pixels to generate a second plurality of transform coefficients, and computing a plurality of prediction residual coefficients as a difference between the plurality of quantized transform coefficients and the second plurality of transform coefficients.

17 Claims, 8 Drawing Sheets

(56) References Cited

U.S. PATENT DOCUMENTS

| | | | | |
|---|---|---|---|---|
| 2009/0225833 | A1* | 9/2009 | Han | H04N 19/105 375/240.12 |
| 2009/0274378 | A1* | 11/2009 | Fukuhara | H04N 19/647 382/232 |
| 2012/0082243 | A1* | 4/2012 | Baylon | H04N 19/619 375/240.26 |
| 2012/0170647 | A1* | 7/2012 | He | H04N 19/48 375/240.03 |
| 2012/0201300 | A1* | 8/2012 | Kim | H04N 19/105 375/240.12 |
| 2012/0320970 | A1* | 12/2012 | Drugeon | H04N 19/563 375/240.02 |

OTHER PUBLICATIONS

"VC-1 Compressed Video Bitstream Format and Decoding Process," SMPTE Standard, SMPTE 421M-2006, The Society of Motion Picture and Television Engineers, Feb. 24, 2006, 493 pages.
Bross, B., et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG11, 7th Meeting, Geneva, CH, Nov. 21-30, 2011, 259 pages.
"Series H: Audiovisual and Multimedia Systems, Infrastructure of Audiovisual Services—Transmission Multiplexing and Synchronization, Information Technology—Generic Coding of Moving Pictures and Associated Audio Information: Systems," ITU-T, Telecommunication Standardization Sector of ITU, H.222.0, May 2012, 234 pages.
"Line Transmission of Non-Telephone Signals, Video Codec for Audiovisual Services at P × 64 kbits," ITU-T, Telecommunication Standardization Sector of ITU, H.261, Mar. 1993, 29 pages.
"Series H: Audiovisual and Multimedia Systems, Infrastructure of Audiovisual Services—Coding of Moving Video, Video Coding for Low Bit Rate Communication," ITU-T, Telecommunication Standardization Sector of ITU, H.263, Jan. 2005, 226 pages.
"Series H: Audiovisual and Multimedia Systems, Infrastructure of Audiovisual Service—Coding of Moving Video, Advanced Video Coding for Generic Audiovisual Service," ITU-T, Telecommunication Standardization Sector of ITU, H.264, Nov. 2007, 564 pages.
Hagai, M., et al., "Improved Video Codign using H.26L ME/MC Techniques," International Organization for Standardization, ISO/IEC JTC1/SC29/WG11, MPEG2001/M7665, XP030036758, Dec. 7, 2001, 8 pages.
Netravali, A, N., et al., "Picture Coding: A Review," XP002028499, Invited Paper, Proceedings of the IEEE, vol. 68, No. 3, Mar. 1, 1980, pp. 366-407.
"Multimedia Communication Technology Passages" Multimedia Communication Technology, Representation, Transmission and Identification of Multimedia Signals, XP002723747, Jan. 2004, pp. 521-539, 590-598.
Motorola Ed, "Modified MPEG-4 Intra Frame Coding Algorithm for JPEG2000," ISO/IEC JTC1/SC29/WG1, N641, Nov. 10-14, 1997, 18 pages.
Foreign Communication From a Counterpart Application, PCT Application No. PCT/US2013/063390, International Search Report dated May 14, 2014, 5 pages.
Foreign Communication From a Counterpart Application, PCT Application No. PCT/US2013/063390, Written Opinion dated May 14, 2014, 10 pages.

* cited by examiner

ARCHITECTURE FOR HYBRID VIDEO CODEC

CROSS-REFERENCE TO RELATED APPLICATIONS

The present application claims priority to U.S. Provisional Patent Application No. 61/710,620 filed Oct. 5, 2012 by Haoping Yu et al. and entitled "Improved Architecture for Hybrid Video Codec, which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Since mid-1980s, several generations of digital video coding standards have been developed by the International Telecommunications Union (ITU) Telecommunications Standardization Sector (ITU-T) Video Coding Experts Group (VCEG) and the International Organization for Standardization and International Electrotechnical Commission (ISO/IEC) Moving Picture Experts Group (MPEG). Examples of video coding standards include H.261, MPEG1, H.262 or MPEG2, MPEG4, H.263, H.264 or MPEG-AVC (Advanced Video Coding). Some of the video coding standards were actually developed jointly by the two standard organizations above. Currently, another video coding standard commonly referred to as High Efficiency Video Coding (HEVC) is under development by the Joint Collaborative Team on Video Coding (JCTVC), which is an expert group jointly created by ITU-T and ISO/IEC.

To achieve high compression efficiency for video signals, designs of video encoding and decoding architectures in some of the existing video coding formats or standards may have been largely the same or similar. Examples of such formats or standards may include those aforementioned, an open video compression format which is developed by GOOGLE and referred to as VP8, and another video compression format which is initially developed by MICROSOFT and referred to as VC-1. A typical architecture may be a hybrid of motion compensated inter-frame prediction, spatial transform coding with scalar quantization, transform coefficient scanning, and entropy encoding. Therefore, video coding standards employing such an architecture are sometimes also referred to as hybrid video coding systems.

SUMMARY

In one embodiment, the disclosure includes a method for video encoding comprising transforming a plurality of pixels to generate a first plurality of transform coefficients, quantizing the first plurality of transform coefficients to generate a plurality of quantized transform coefficients, computing a plurality of prediction pixels based on a plurality of reconstructed pixels which are prediction references for the plurality of pixels, transforming the plurality of prediction pixels to generate a second plurality of transform coefficients, and computing a plurality of prediction residual coefficients as a difference between the plurality of quantized transform coefficients and the second plurality of transform coefficients.

In another embodiment, the disclosure includes an apparatus comprising a processor configured to transform a pixel block comprising a plurality of pixels to generate a transform block comprising a plurality of transform coefficients, quantize the transform block to generate a quantized transform block comprising a plurality of quantized transform coefficients, compute a prediction block based on a set of reconstructed pixels that are prediction references for the pixel block, transform the prediction block to generate a transformed prediction block, and compute a prediction residual block as a difference between the quantized transform block and the transformed prediction block.

In yet another embodiment, the disclosure includes a method for video decoding comprising decoding a plurality of encoded residual coefficients to generate a plurality of decoded residual coefficients, transforming a plurality of prediction pixels to generate a plurality of transform coefficients, computing a plurality of reconstructed coefficients as a sum of the plurality of decoded residual coefficients and the plurality of transform coefficients, and generating a plurality of reconstructed pixels based on the plurality of reconstructed coefficients, wherein the plurality of prediction pixels are predicted versions of the plurality of reconstructed pixels.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

To effectively remove redundancy in the digital video signal and therefore achieve high compression efficiency, some existing video coding standards run a similar hybrid coding system that may comprise motion compensated inter-picture prediction, spatial transform coding with scalar quantization, transform coefficient scanning and entropy encoding. In this hybrid system, previously coded pixels may be used as prediction references to predict a pixel block currently being coded. Depending on where the prediction references are located, there exists inter-picture or inter-frame prediction (in short as inter prediction, in which case reference pixels reside in a previously coded video picture or frame) and intra-frame prediction (in short as intra prediction, in which case reference pixels reside in a previously coded pixel block of the current video frame).

In inter prediction on an encoder side, motion compensation may be performed by using a block of pixels, which is a reconstructed version of pixels residing in a previously coded frame, as prediction reference for a block of pixels residing in the current frame. Prediction residual pixels may be generated as a difference between the reference pixels and the current block. In addition, the prediction residual pixels may be subject to transform, quantization, and entropy encoding processes. Eventually, encoded coefficients may represent a compressed version of the current frame. During the compression process, noise signal (e.g., quantization noise) may exist in the motion compensation prediction signal of a previously quantized and encoded frame. In a conventional coding scheme, such noise may be transformed and quantized during the encoding of the current frame. Consequently, noise may propagate with coding, impairing the compression quality of the current frame.

Figure 1:
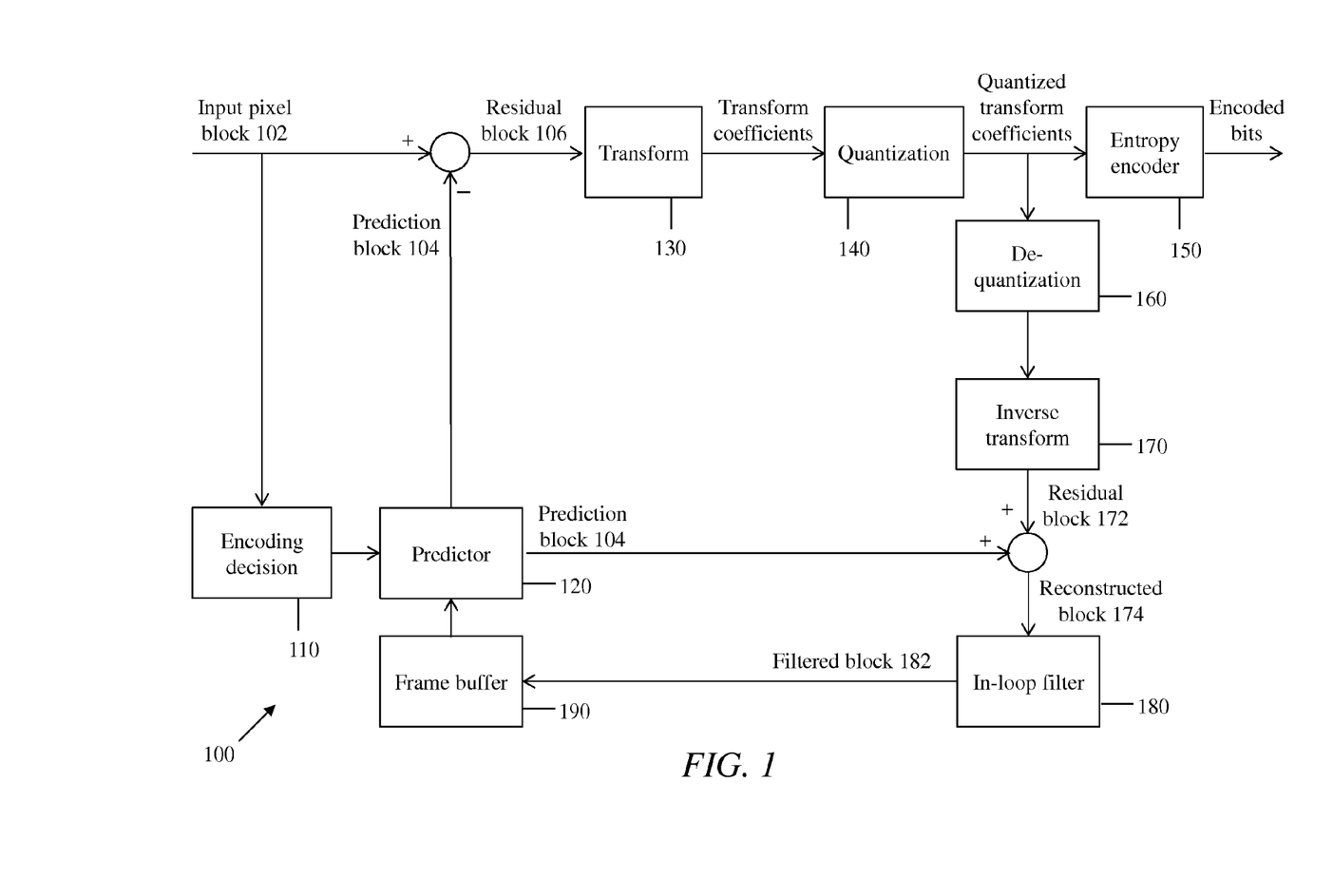
FIG. 1 is a schematic diagram of a conventional video encoder.

FIG. 1 is a schematic diagram of a conventional video encoder 100, which may comprise various modules or units including an encoding decision module 110, a predictor or prediction module 120, a transform module 130, a quantization module 140, an entropy encoder 150, a dequantization (or inverse quantization) module 160, an inverse transform module 170, an in-loop filter 180, and a frame buffer 190, arranged as shown in FIG. 1.

An input video such as a source video frame or picture comprising an input pixel block 102 may be fed into the encoder 100. To encode the input pixel block 102, a prediction block 104 may be generated based on one or more reference blocks, which have been previously encoded. The prediction block 104 is an estimated or predicted version of the input pixel block 102. A residual block 106 may be generated as a difference between the block 102 and the prediction block 104. Since an amount of data needed to represent the prediction residuals may typically be less than an amount of data needed to represent the input pixel block 102, the residual block 106 may be encoded to achieve a higher compression ratio.

As shown in FIG. 1, the residual block 106 may feed into the transform module 130. As a result, the residual pixels in a spatial domain may be converted to transform coefficients in a frequency domain by applying a transform matrix. Further, in the quantization module 140 that follows the transform module 130, a number of high-index transform coefficients may be reduced to zero, which may be skipped in subsequent entropy encoding steps. After quantization, quantized transform coefficients may be entropy encoded by the entropy encoder 150.

Further, to facilitate continuous encoding of input pixel blocks (or continuous encoding of pixels in one original block), the quantized transform coefficients may be fed into the dequantization module 160, which may perform the inverse of the quantization module 140 and recover a scale of the transform coefficients. Then, the recovered transform coefficients may further feed into the inverse transform module 170, which may perform the inverse of the transform module 130 and convert transform coefficients from a frequency domain to a residual block 172 in a spatial domain.

In the encoder 100, the residual block 106 may be converted to the residual block 172 after going through a series of operations, e.g., including transform, quantization, dequantization, and inverse transform. Since some or all of these operations may introduce noise, information loss may be caused during the conversion process. Thus, the residual block 172 may be an approximation of the corresponding residual block 106, and usually comprises less non-zero residual pixels for higher compression efficiency. Further, the residual block 172 may be combined with the corresponding prediction block 104 to form a reconstructed block 174, e.g., by adding the two blocks together to generate a sum. Unless otherwise stated, a corresponding block may indicate a block located at a same relative position of a picture.

The reconstructed block 174 may be used as a reference block to generate the prediction block 104. The encoding decision module 110 may control the predictor 120 by determining how the current frame is to be predicted. The current frame may be predicted via inter and/or intra prediction. In inter prediction, the encoding decision module 110 may determine a motion vector of a block in the current frame based on a corresponding block in one or more reference frames. On the other hand, in intra prediction, reference pixels adjacent to a current block may be used to generate a prediction block. Intra prediction may be implemented using any of a plurality of available prediction modes or directions (e.g., 35 modes for luma components in HEVC), which may be determined by the encoding decision module 110.

Compression may cause visible discontinuity in the boundary area belonging to different blocks, which may be referred to as blocking artifacts. To improve the quality of a reconstructed video frame, an in-loop filtering step may be performed. For example, the in-loop filter 180 may be a deblocking filter applied to pixels located on the edges of the reconstructed block 174 to remove or reduce blocking artifacts. The filter 180 may be applied after an inverse transform in the encoder and before using the reconstructed block 174 as prediction reference for prediction. As a result of in-loop filtering, block boundaries may be smoothed, improving the appearance of decoded video frames (particularly at higher compression ratios). The in-loop filter 180 may further comprise a sample adaptive offset (SAO) module, which may also be configured to modify values of reconstructed pixels.

After in-loop filtering, unfiltered pixels in the reconstructed block 174 may be converted to filtered pixels in a filtered block 182. Further, the filtered block 182 may be stored in a frame buffer 190. One or more reference frames containing multiple reference blocks may be stored in the frame buffer 190. The predictor 120 may search for any reference block in the frame buffer 190 to determine which is the best for inter/intra prediction.

As shown in FIG. 1, prediction (e.g., motion compensation or intra prediction) in the encoder 100 is performed before the transform and quantization processes. Thus, prediction residuals are computed using pixels in the spatial domain but not transform coefficients in the transform frequency domain. It can be seen that compression noise existing in the previously encoded frames or pixels may go through the entire transform and quantization and entropy encoding process chain. For example, during encoding of a reference frame, quantization noise may be generated by the quantization module 140. In the conventional video encoder 100, such quantization noise may be re-quantized during encoding of a current frame, which leads to degrading of compression quality and/or efficiency.

Figure 2:
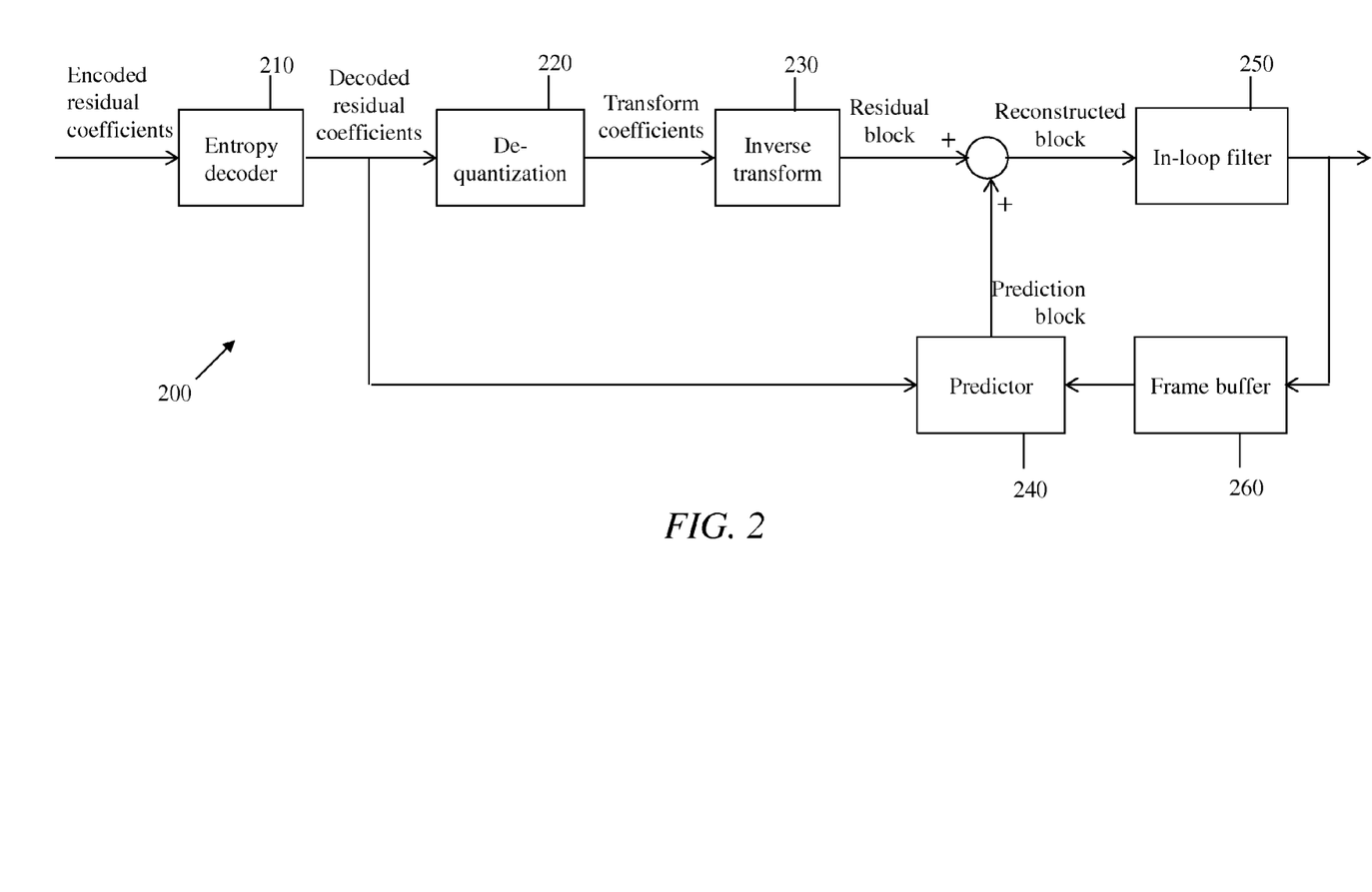
FIG. 2 is a schematic diagram of a conventional video decoder.

FIG. 2 is a schematic diagram of a conventional video decoder 200 corresponding to the encoder 100. To properly reconstruct video frames, the architecture of the decoder 200 may be determined by the encoder 100. The decoder 200 may comprise an entropy decoder 210, a dequantization module 220, an inverse transform module 230, a predictor or prediction module 240, an in-loop filter 250, and a frame buffer 260, arranged as shown in FIG. 2.

In operation, a bitstream containing encoded residual pixels (representing information of a sequence of video frames) may be received by the entropy decoder 210, which may decode the bitstream to an uncompressed format. A matrix of quantized transform coefficients may be generated, which may then be fed into the dequantization module 220. Then, output of the dequantization module 220 may be fed into the inverse transform module 230, which may convert transform coefficients to residual values of a residual block. In addition, information containing a prediction mode of the current block may also be decoded by the entropy decoder 210. Based on the prediction mode, the predictor 240 may generate a prediction block for the current block. Then, a reconstruction module may combine the residual block with the prediction block to generate a reconstructed block. To further improve video quality, the in-loop filter 250 may be used to remove blocking artifacts and other noises.

Additionally, to facilitate continuous decoding, the filtered pixels may be stored in the frame buffer 260, and may be used as part of a reference frame for inter prediction of future frames. Some pixels of the reconstructed block may also serve as reference pixels for intra prediction of future blocks in the same frame. It should be understand that, although the encoder 100 and the decoder 200 are described herein as conventional coding architectures, certain aspects of the video encoder 100 or decoder 200 may still be used to implement embodiments of video codecs disclosed herein.

The present disclosure teaches a new video codec (encoder and/or decoder) architecture, which may improve the overall compression quality and/or efficiency as compared with a conventional video codec architecture. Example embodiments are presented for implementing the new architecture. The inventors recognized that it may be beneficial to perform motion compensation or spatial prediction right after transform and quantization processes and right before an entropy encoding process. Benefits of this new encoder and decoder architecture may include better compression efficiency and better compression quality in both objective and subjective measures.

The disclosed embodiments may prevent quantization noise resulting from the encoding of the current frame propagating to future frames, e.g., in a group of pictures (GOP). Therefore, the disclosed embodiments may simplify rate-control and rate distortion optimization (RDO), and may bring opportunities for new designs for various modules such as transform, quantization, and entropy encoder. For example, with the disclosed new architecture, a transform matrix may be designed to match content characteristics of a video frame for purpose of compression. Furthermore, the disclosed architecture may enable the usage of a new quantizer and entropy coder that may be optimized by taking into account the characteristics of the disclosed encoding and decoding (coding) architecture.

Figure 3:
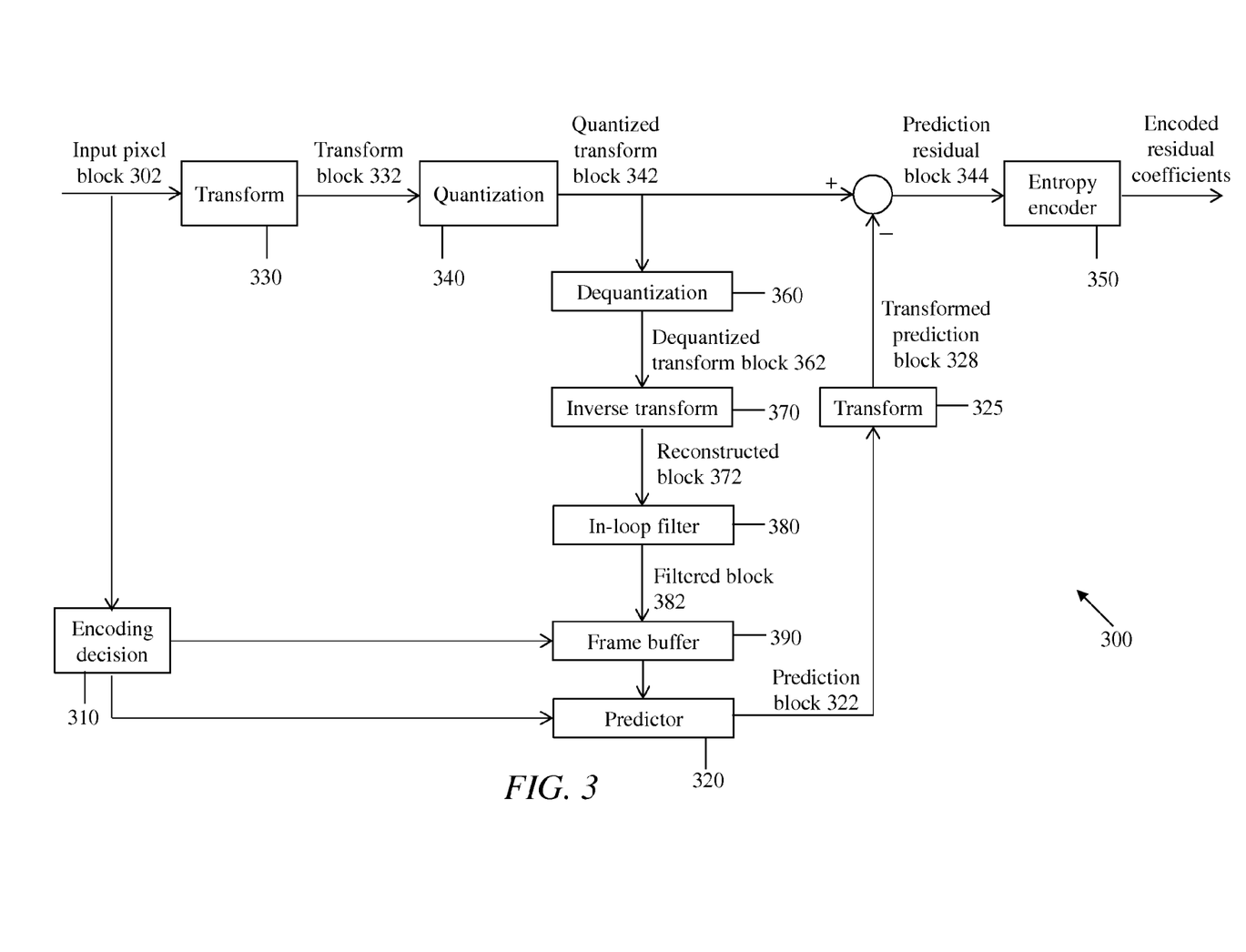
FIG. 3 is a schematic diagram of an embodiment of a video encoder.

FIG. 3 is a schematic diagram of an embodiment of a video encoder 300, which may comprise various modules or units including an encoding decision module 310, a predictor 320, a first transform module 325, a second transform module 330, a quantization module 340, an entropy encoder 350, a dequantization (or inverse quantization) module 360, an inverse transform module 370, an in-loop filter 380, and a frame buffer 390, arranged as shown in FIG. 3. One of ordinary skill in the art will recognize that various aspects of the encoder 300 (e.g., quantization, dequantization, inverse transform, intra prediction, inter prediction, frame buffering, etc.) may be substantially similar to those in the encoder 100. Thus in the interest of conciseness, further descriptions may focus on the aspects that are different or not yet covered. Note that the transform module 325 is a new module that is not present in the conventional encoder 100.

Briefly, in contrast to the conventional encoder 100, prediction (e.g., motion compensation or intra prediction) in the encoder 300 may be performed after an input pixel block has been transformed and quantized. Thus, prediction residuals are computed using transform coefficients in the transform frequency domain but not pixels in the spatial domain. Prediction residuals may go through the entropy encoding process. Thus, as shown in FIG. 3, compression noise may not have a chance to feedback via prediction, and instead may only go through the last entropy coding step.

More specifically, an input video such as a source video frame or picture comprising an input pixel block 302 may be fed into the encoder 300. Note that the input pixel block 302 labeled out in FIG. 3 serves merely as an illustrative example. In practice, a picture may comprise a plurality of input pixel blocks, each of which comprises a plurality of original pixels. Further, pixels in one block may be processed as one or more groups or one-by-one, thus one skilled in the art will recognize that the input pixel block 302 may be modified to be a plurality of input pixels or an input pixel without departing from the principles of this disclosure. The term "input" or "original" indicates that the block or pixel has not yet been processed by the encoder 300, thus it is not necessarily limiting the picture to be a raw capture picture, that is, any appropriate processing may be performed on the picture before feeding into the encoder 300.

As shown in FIG. 3, the input pixel block 302 comprising a plurality of pixels may feed into the transform module 330, which may transform the pixel block 302 to generate a transform block 332 comprising a plurality of transform coefficients. In this process, the input pixels in a spatial domain are converted to transform coefficients in a frequency domain by applying a transform matrix. The conversion may be realized through a two-dimensional transform, e.g. a transform that closely resembles or is the same as discrete cosine transform (DCT). Since the transform matrix is directly applied on input pixels instead of prediction residuals, a transform matrix used by the transform module 330 may be designed to utilize video content, e.g., to match content characteristics of a video frame for the purpose of compression.

Next, the quantization module 340 may quantize the transform block 332 to generate a quantized transform block 342 comprising a plurality of quantized transform coefficients. During quantization, a number of high-index transform coefficients may be reduced to zero, which may be skipped in subsequent entropy encoding steps. As a tradeoff, quantization noise may be introduced by the quantization module 340.

To facilitate continuous encoding of input pixel blocks (or continuous encoding of pixels in one original block), the quantized transform coefficients may feed into the dequantization module 360, which may perform the inverse of the quantization module 340 and recover a scale of the transform coefficients. The quantized transform block 342 may be converted to a dequantized transform block 362 by the dequantization module 360. Then, the dequantized transform block 362 comprising recovered transform coefficients may further feed into an inverse transform module 370, which may perform the inverse of the transform module 330 and convert transform coefficients from a frequency domain to a reconstructed pixel block 372 in a spatial domain.

In the encoder 300, the input pixel block 302 may be converted to the reconstructed pixel block 372 after going through a series of operations, e.g., including transform, quantization, dequantization, and inverse transform. Since some or all of these operations may introduce noise, information loss may be caused during the conversion process. For example, quantization noise introduced during quantization may still exist in the reconstructed pixel block 372. Thus, the pixel block 372 may be an approximation or lossy version of the corresponding input block 302, and usually comprises more compression noise for higher compression efficiency. For this reason, the encoder 300 implements a lossy coding mode.

The reconstructed block 372 may be used as a reference block to generate the prediction block 322. Depending on the location of the reconstructed block 372, prediction may be categorized as inter prediction or intra prediction. In use, successive video frames or slices may be substantially correlated, such that a block in a frame does not substantially vary from a corresponding block in a previously coded frame. Inter prediction implemented by the predictor 320 may exploit temporal redundancies in a sequence of frames or pictures, e.g. similarities between corresponding blocks of successive frames, to reduce compression data. In inter prediction, motion estimation and motion compensation may be implemented to calculate a motion vector for a current block in a current frame based on a corresponding block located in one or more reference frames preceding the current frame according to an encoding order.

Similarly, within a video frame, a pixel may be correlated with other pixels within the same frame such that pixel values within a block or across some blocks may vary only slightly and/or exhibit repetitious textures. To exploit spatial correlations between neighboring blocks in the same frame, intra prediction may be implemented by the predictor 320 to interpolate the prediction block 322 from one or more previously coded neighboring blocks (including the reconstructed block 372). The encoder 300 and a corresponding decoder may interpolate the prediction block independently, thereby enabling a substantial portion of a frame and/or image to be reconstructed from the communication of a relatively few number of reference blocks, e.g., blocks positioned in (and extending from) the upper-left hand corner of the frame.

The encoding decision module 310 may control the predictor 320 by determining how the current frame is to be predicted. The current frame may be predicted via inter and/or intra prediction. In inter prediction, the encoding decision module 310 may determine a motion vector of a block in the current frame based on a corresponding block in one or more reference frames. On the other hand, in intra prediction, reference pixels adjacent to a current block may be used to generate a prediction block. Intra prediction (i.e., intra frame prediction) may be implemented using any of a plurality of available prediction modes or directions (e.g., 35 modes for luma components in HEVC), which may be determined by the encoding decision module 310. For example, the encoding decision module 310 may calculate a sum of absolute error (SAE) for each prediction mode, and select a prediction mode that results in the smallest SAE.

In general, block-based compression may cause visible discontinuity in the boundary area belonging to different blocks, which may be referred as blocking artifacts. The severity of these artifacts depends on different levels of compression. In general, the stronger the intensity of quantization, the more severe the potential artifacts. Such a phenomenon, when prominent, may significantly degrade the video quality. To improve the quality of a reconstructed video frame (e.g., by reducing blocking artifacts), an in-loop filtering step may be performed before prediction. For example, the in-loop filter 380 may be a deblocking filter applied to pixels located on the edges of the reconstructed block 372 to remove or reduce blocking artifacts and generate filtered pixels. The in-loop filter 380 may be applied after an inverse transform in the encoder and before using the reconstructed block 372 as prediction reference for prediction. As a result of in-loop filtering, block boundaries may be smoothed, improving the appearance of decoded video frames (particularly at higher compression ratios). In many instances, deblocking may be applied to both luminance and chrominance data.

The in-loop filter 380 may further comprise a sample adaptive offset (SAO) module, which may also be configured to modify values of reconstructed pixels. There may be two types of SAO including band offset and edge offset. Take band offset as an example. The SAO module may classify pixels into a set of bands (e.g., 0-255 values evenly classified into 32 bands). In use, each band may have a different offset value assigned by the SAO module, which may modify pixel value by this offset value. The SAO module may create a global effect in a picture, which may improve subjective quality and/or achieve objective coding gain. Although not shown in FIG. 3, depending on the application, other types of in-loop filtering, such as adaptive loop filtering (ALF), may also be included in the in-loop filter 380.

After in-loop filtering, unfiltered pixels in the reconstructed block 372 may be converted to filtered pixels in a filtered block 382. Further, the filtered block 382 may be stored in a frame buffer 390. One or more reference frames containing multiple reference blocks may be stored in the frame buffer 390. The predictor 320 may search for any reference block in the frame buffer 390 to determine which is the best for inter/intra prediction.

A prediction block 322 comprising a plurality of prediction pixels may be generated based on one or more reference blocks, which have been previously encoded. A block currently being coded may be referred to as a current block, and a pixel currently being coded in the current block referred to as a current pixel. The prediction block 322 is an estimated or predicted version of the input pixel block 302.

In an embodiment, the prediction block 322 may be further transformed by the transform module 325 to generate a transformed prediction block 328, which comprises a plurality of transform coefficients. Note that the transform module 325 may or may not use the same transform matrix as the transform module 330. Moreover, a prediction residual block 344 may be generated as a difference between the quantized transform block 342 and the transformed prediction block 328. The residual block 344 comprises a plurality of prediction residual coefficients and represents prediction residuals or errors in the transform frequency domain. Since an amount of data needed to represent the prediction residuals may typically be less than an amount of data needed to represent the input pixel block 302, the residual block 344 may be encoded to achieve a higher compression ratio.

The residual block 344 may be entropy encoded by the entropy encoder 350. The entropy encoder 350 may employ any entropy encoding scheme, such as context-adaptive binary arithmetic coding (CABAC) encoding, exponential Golomb encoding, or fixed length encoding, or any combination thereof. After entropy encoding, compressed video bits may be transmitted by the encoder 300 as part of a bitstream.

As shown in FIG. 3, prediction (e.g., motion compensation or intra prediction) in the encoder 300 is performed after the transform and quantization processes. Compression noise may not have a chance to feedback via prediction, and instead may only go through the last entropy coding step. Compared with conventional encoder architecture, the disclosed encoder may achieve higher quality in compressed video pixels.

Figure 4:
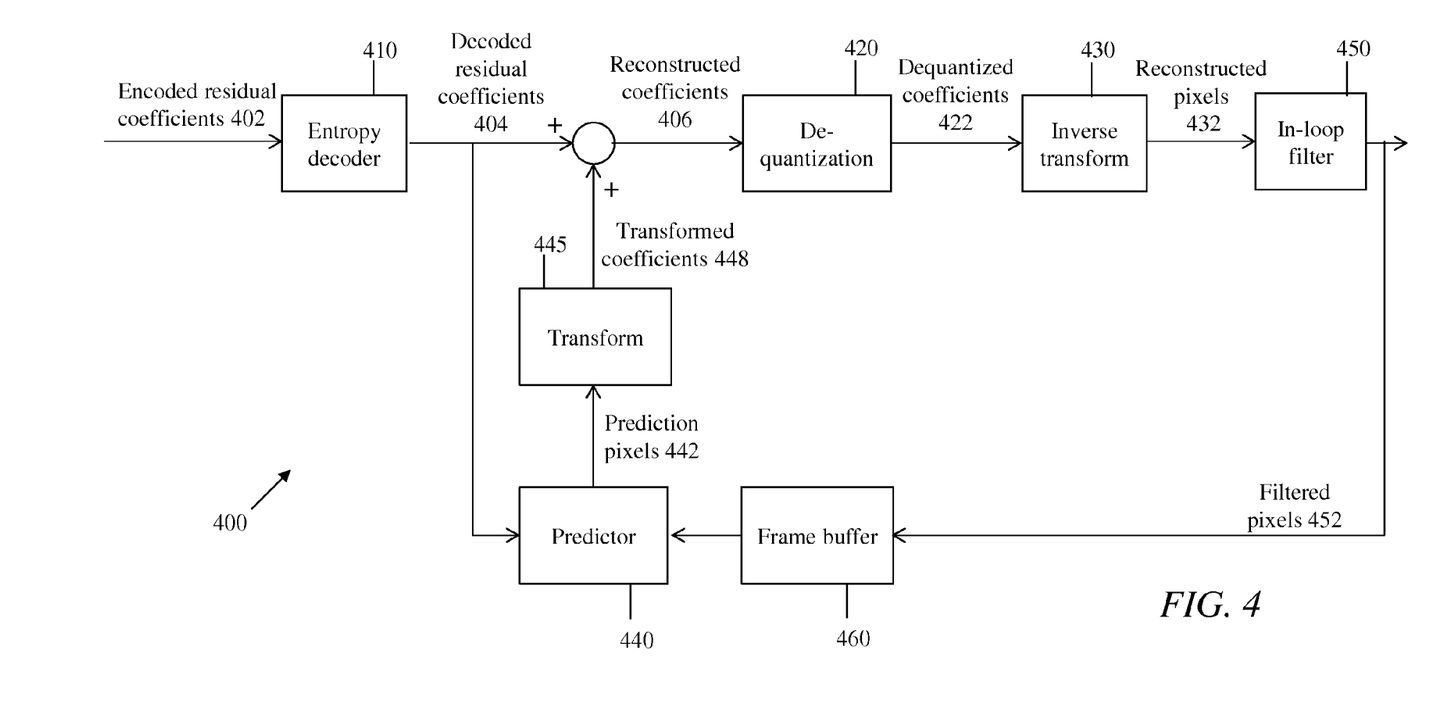
FIG. 4 is a schematic diagram of an embodiment of a video decoder.

FIG. 4 is a schematic diagram of an embodiment of a video decoder 400 corresponding to the encoder 300. To properly reconstruct video frames, the architecture of the decoder 400 may be determined by the encoder 300. The decoder 400 may comprise an entropy decoder 410, a dequantization module 420, an inverse transform module 430, a predictor or prediction module 440, a transform module 445, an in-loop filter 450, and a frame buffer 460, arranged as shown in FIG. 4. One of ordinary skill in the art will recognize that various aspects of the decoder 400 (e.g., dequantization, inverse transform, intra prediction, inter prediction, frame buffering, etc.) may be substantially similar to those in the encoder 300. Thus in the interest of conciseness, further descriptions may focus on the aspects that are different or not yet covered. Note that the transform module 445 is a new module that is not present in the conventional decoder 200.

In operation, a bitstream may be received by the entropy decoder 410, which may decode the bitstream to an uncompressed format. The bitstream comprises encoded residual pixels 402 representing information of a sequence of video frames. A plurality of decoded residual coefficients 404 (or quantized transform coefficients) may be generated.

In addition, information containing a prediction mode of the current block may also be decoded by the entropy decoder 410. Based on the prediction mode, the predictor 440 may generate a prediction block for the current block. The prediction block may comprise a plurality of prediction pixels 442, which are predicted versions of the plurality of reconstructed pixels 432.

In an embodiment, the prediction pixels 442 may be transformed by the transform module 445 to become a plurality of predicted transform coefficients 448 located in a transformed prediction block. Note that, to ensure proper video reconstruction, the transform module 445 may use the same transform matrix as the transform module 325 in FIG. 3. Further, a reconstruction module may combine the each of the decoded residual coefficients 404 with a corresponding one of the predicted transform coefficients 448 to generate a plurality of reconstructed transform coefficients 406.

Further, the reconstructed transform coefficients 406 may feed into the dequantization module 420, which may be the same or similar to the dequantization module 340 in FIG. 3. Then, dequantized transform coefficients 422 generated by the dequantization module 420 may feed into the inverse transform module 430, which may convert transform coefficients 422 to reconstructed pixels 432 of a reconstructed block.

To further improve video quality, the in-loop filter 450 may be used to remove blocking artifacts and other noises. The in-loop filter 450 may filter the plurality of reconstructed pixels 432 to generate a plurality of filtered pixels 452. Additionally, to facilitate continuous decoding, the filtered pixels 452 may be stored in the frame buffer 460, and may be used as part of a reference frame for inter prediction of future frames. Some pixels of the reconstructed block may also serve as reference pixels for intra prediction of future blocks in the same frame.

In the decoder 400, prediction (e.g., motion compensation or intra prediction) may be performed before dequantization and inverse transform. Reconstruction may be performed in the transform frequency domain instead of the spatial domain. Thus, similar to its corresponding encoder, subjective and/or object quality of the reconstructed videos generated using the decoder 400 may improve over conventional architectures.

As mentioned above, the disclosed coding systems and methods may help prevent quantization noise (caused in coding of a reference block or pixel) from propagating to the coding of a current block or pixel. The following mathematical derivation process further clarifies this point.

Figure 5:
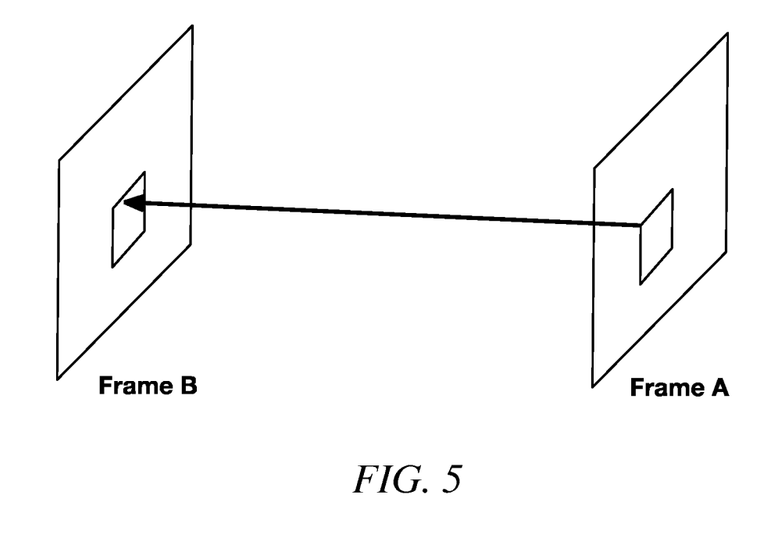
FIG. 5 is a schematic diagram showing inter-frame prediction between two video frames.

FIG. 5 is a schematic diagram showing inter-frame prediction between two video frames denoted as Frame A and Frame B, assuming Frame B is used as prediction reference for Frame A. The disclosed approach may also work in the same way for intra-prediction, when the notion of $P_b$ represents the intra prediction signal. Note that although inter-frame prediction is used as an example to show working principles disclosed herein, one of ordinary skill in the art will recognize that intra-frame prediction may work similarly.

For convenience of discussion, the following notations are used. Note that notations used herein may represent a matrix, which may comprise either a plurality of pixels in the pixel domain or a plurality of transform coefficients in the transform frequency domain.

Pa: original uncompressed pixel block in Frame A;
CPa: compressed pixel block in Frame A;
NQa: quantization noise associated with CPa;
Pb: original uncompressed pixel block in Frame B;
CPb: compressed pixel block in Frame B;
NQb: quantization noise associated with CPb;
PResab: prediction residual signal from B to A without quantization noise;
CPResab: compressed prediction residual signal from B to A with quantization noise;
CPResFab: transform frequency domain representation of CPResab;
$NQPRes_{ab}$: noise due to the quantization of PResab.
T( ): a two-dimensional (2D) linear transform process;
Q[ ]: a 2D quantization process in the transform frequency domain.

Using the notations above, following equations may be introduced:

$$P_a = P_b + PRes_{ab} \tag{1}$$

$$CP_b = P_b + NQ_b \tag{2}$$

$$CP_a = P_a + NQ_a \tag{3}$$

$$CP_a = CP_b + CPRes_{ab} \tag{4}$$

Next, a comparison is made between the conventional encoder 100 in FIG. 1 and the disclosed encoder 300 in FIG. 3. Although the encoder side is analyzed as an example, one of ordinary skill in the art will recognize that a comparison of the decoder side (e.g., between the decoder 200 in FIG. 2 and the decoder 400 in FIG. 4) works similarly.

Using the conventional encoder 100 and the equations (1) to (4) above, equation (5) may be obtained as:

$$CPResF_{ab} = Q[T(P_a - CP_b)] \quad (5)$$
$$= Q[T(P_a) - T(CP_b)]$$
$$= Q[T(P_a) - T(P_b + NQ_b)]$$
$$= Q[T(P_a) - T(P_b) - T(NQ_b)]$$
$$= PResF_{ab} + NQPResF_{ab}$$

The equation (5) indicates that, if a pixel block from Frame B is used as prediction reference in encoding a pixel block in Frame A, a quantization noise associated with the compressed Frame B, i.e. $NQ_b$, may be subject to re-quantization, which leads to propagation of the quantization noise. This can also be seen in the pixel domain as below:

$$CP_a = CP_b + CPRes_{ab} \quad (6)$$
$$= P_b + NQ_b + PRes_{ab} + NQPRes_{ab}$$
$$= P_a + NQ_b + NQPRes_{ab}$$

Comparing equations (3) and (6), the conventional encoder 100 may result in a compression noise: $NQ_a = NQ_b + NQPRes_{ab}$.

In comparison, using the disclosed encoder 300 and equations (1) to (4) above, equation (7) may be obtained as:

$$CPResF_{ab} = Q[T(P_a)] - T(CP_b) \quad (7)$$
$$= T(P_a) + T(NQ_a) - T(P_b) - T(NQ_b)$$
$$= PResF_{ab} + T(NQ_a) - T(NQ_b)$$

In equation (7), $PResF_{ab} = T(P_a) - T(P_b)$ stands for an ideal prediction in the transform frequency domain without any quantization noise. Using equation (7), the coded pixel block Pa may be expressed in the transform frequency domain as follows:

$$T(CP_a) = T(CP_b) + CPResF_{ab} \quad (8)$$
$$= T(P_b) + T(NQ_b) + PResF_{ab} + T(NQ_a) - T(NQ_b)$$
$$= T(P_a) + T(NQ_a)$$

Since the transform T may be linear, equation (8) may lead directly to $CP_a = P_a + NQ_a$ as shown in (3). Therefore, equation 8 shows that with the disclosed encoder 300, when one or more compressed frames with a quantization noise are used as prediction references in motion compensation, a quantization noise associated with each frame may be kept to the current frame and may not propagate to any future or later frames in a GOP.

As described and shown above, on the encoder side (e.g., in encoder 300), the motion compensation and intra-prediction may be performed after the transform and quantization process, whereas in a conventional video encoder (e.g., in conventional video encoder 100), the motion compensation and intra prediction may be performed before the transform and quantization process. Similarly, on the decoder side (e.g., in decoder 400), previously reconstructed pixels may first be taken to a transform process and then these transform coefficients may be used in motion compensation or intra prediction, whereas a conventional decoder (e.g., in conventional decoder 200) may not have any transform process and may perform motion compensation and intra prediction in the pixel domain. Another difference is that a disclosed decoder may perform motion compensation and intra prediction right after entropy decoding, whereas a conventional decoder may perform motion compensation and intra prediction after inverse quantization and inverse transform processes.

In addition, with the new encoding and decoding architectures disclosed herein, various modules or units may be re-designed or fine-tuned to optimize their performance, which may lead to additional coding gains in terms of efficiency and/or quality. For example, a transform module may be designed to match the characteristic of the contents of a video frame for purpose of compression. Thus, new transform matrices may be used. Furthermore, the new architecture disclosed herein may enable the usage of new quantization module and entropy coder, which may be optimized by taking into account the characteristic of the new transform process.

Figure 6:
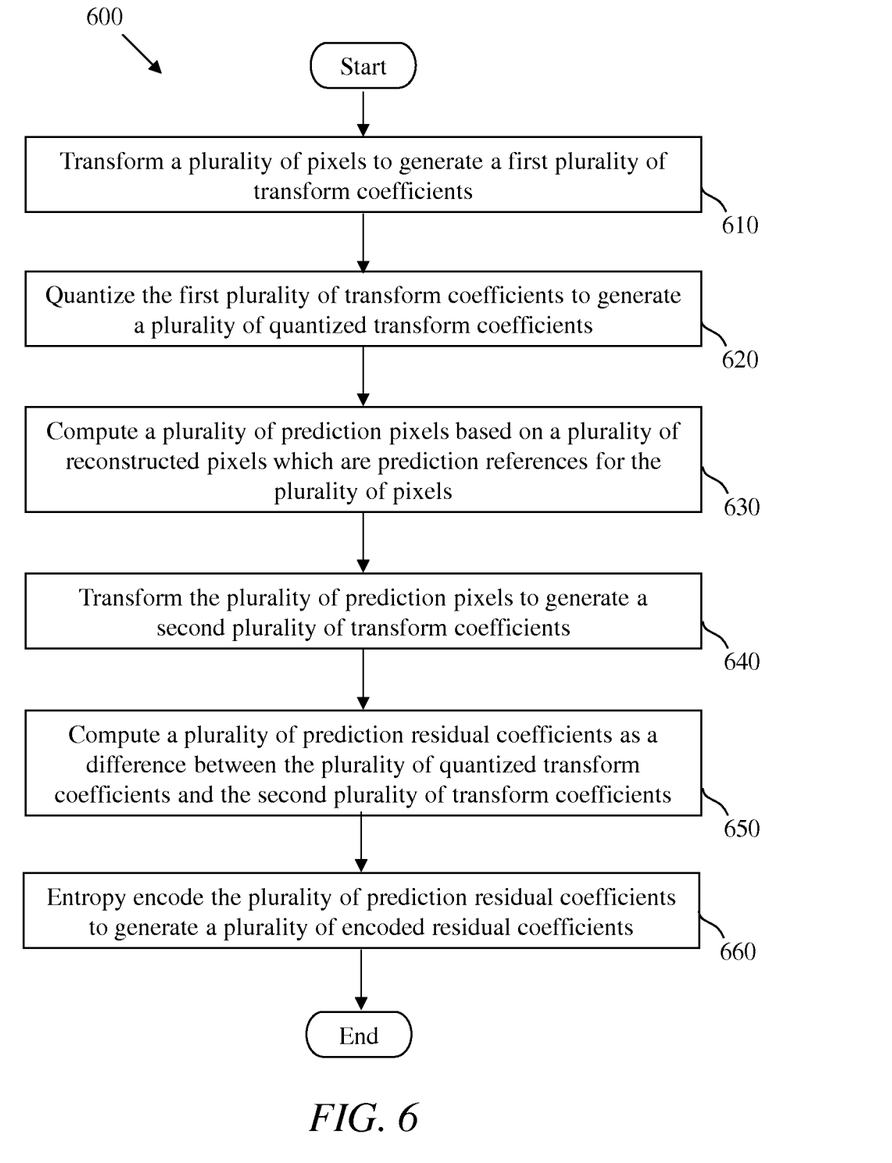
FIG. 6 is a flowchart of an embodiment of a video encoding method.

FIG. 6 is a flowchart of an embodiment of a video encoding method 600, which may be implemented by a video encoder (e.g., the encoder 300). The method 600 starts in step 610, in which the encoder may transform a plurality of pixels to generate a first plurality of transform coefficients. The plurality of pixels may be located in an input pixel block (e.g., input pixel block 302), and the first plurality of transform coefficients may be located in a transform block (e.g., the transform block 332). In an embodiment, since the transform is performed directly on input pixels, a transform matrix used in transforming the plurality of pixels may be selected to match content characteristics of the video frame.

In step 620, the encoder may quantize the first plurality of transform coefficients to generate a plurality of quantized transform coefficients, which may reside in a quantized transform block (e.g., the quantized transform block 342). In step 630, the encoder may compute a plurality of prediction pixels based on a plurality of reconstructed pixels which are prediction references for the plurality of pixels. The plurality of prediction pixels may be located in a prediction block (e.g., the prediction block 322), and the plurality of reconstructed pixels may be located in a reconstructed block (e.g., the reconstructed block 372).

Prediction may be inter-frame or intra-frame. In an embodiment of inter prediction, the plurality of pixels are located in a current frame, the plurality of reconstructed pixels are located in a reference frame which may be in the same GOP with the current frame. In an embodiment of intra prediction, the plurality of pixels are located in a current block, and the plurality of reconstructed pixels are located in a reference block that has been coded before the current block. In this case, computing the plurality of prediction pixels uses the reference block for intra-frame prediction and follows an intra prediction mode selected from a plurality of available intra prediction modes.

In step 640, the encoder may transform the plurality of prediction pixels to generate a second plurality of transform coefficients, which may be located in a transformed prediction block (e.g., the transformed prediction block 328). In an embodiment, transforming the plurality of pixels (in step 610) and transforming the plurality of prediction pixels (in step 640) use an identical transform matrix. Further, the second plurality of transform coefficients may be directly used, without any quantization, to compute the plurality of prediction residual coefficients. Therefore, quantization noises may be constrained to impact only the current block/frame and not any future block/frame. For example, a quantization noise may be carried by the plurality of quantized transform coefficients that have been computed via quantization prior to transforming the plurality of pixels. In this case, the quantization noise may have no impact on the quantization of the first plurality of transform coefficients.

In step 650, the encoder may compute a plurality of prediction residual coefficients as a difference between the plurality of quantized transform coefficients and the second plurality of transform coefficients. The plurality of prediction residual coefficients may be located in a prediction residual block (e.g., the prediction residual block 344). In step 660, the encoder may entropy encode the plurality of prediction residual coefficients to generate a plurality of encoded residual coefficients, which may then be transmitted from the encoder.

Note that FIG. 6 illustrates only a portion of necessary steps in encoding video frames or blocks in a frame, thus the method 600 may include any other step as necessary to complete encoding. For example, the plurality of reconstructed pixels used in step 630 may be generated by inverse transforming a plurality of dequantized transform coefficients. In turn, the plurality of dequantized transform coefficients may be generated by dequantizing another plurality of quantized transform coefficients that have been computed via quantization prior to transforming the plurality of pixels. Further, the plurality of reconstructed pixels may be filtered using one or more in-loop filters before being used as the prediction references. The one or more in-loop filters may include at least one of a deblocking filter and an SAO filter.

Figure 7:
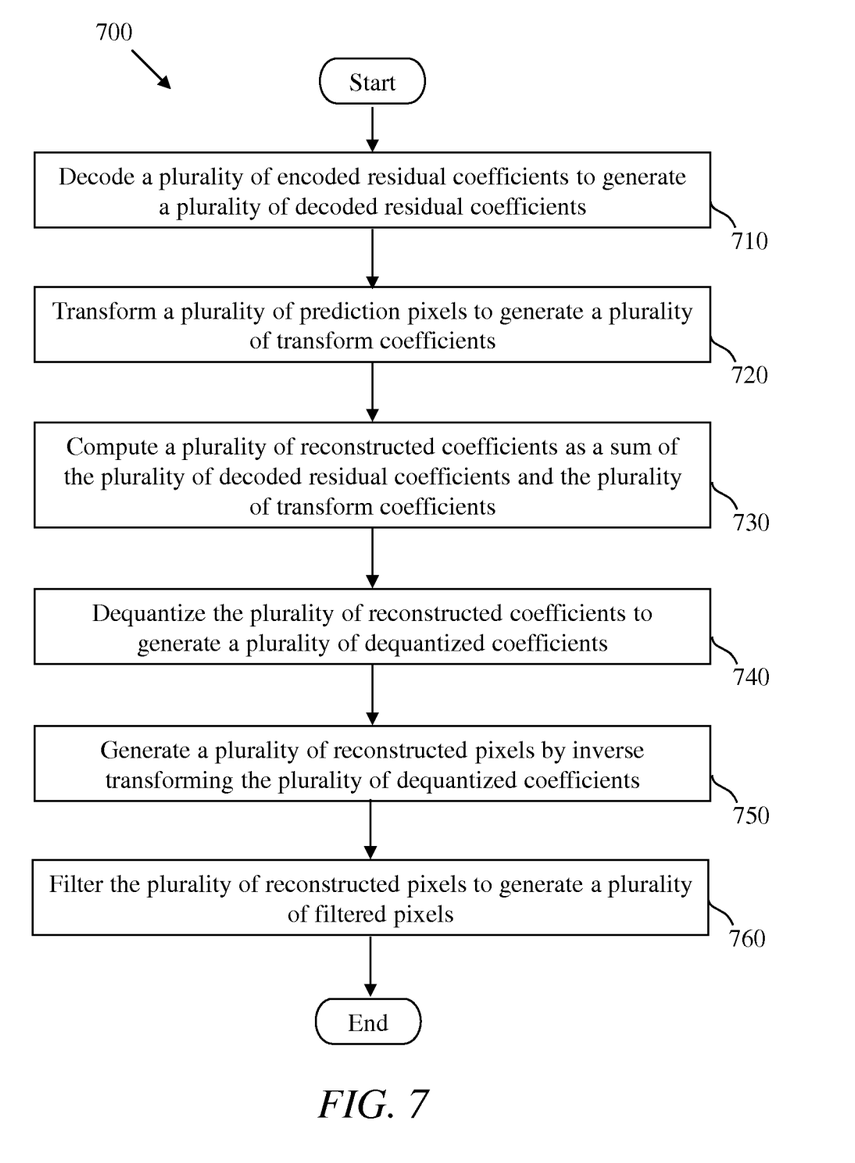
FIG. 7 is a flowchart of an embodiment of a video decoding method.

FIG. 7 is a flowchart of an embodiment of a video decoding method 700, which may be implemented by a video decoder (e.g., the decoder 400). The method 700 starts in step 710, in which the decoder may decode a plurality of encoded residual coefficients (e.g., the encoded residual coefficients 402) to generate a plurality of decoded residual coefficients (e.g., the decoded residual coefficients 404).

In step 720, the decoder may transform a plurality of prediction pixels (e.g., the prediction pixels 442) to generate a plurality of transform coefficients (e.g., the transformed coefficients 448). Note that the plurality of prediction pixels are predicted versions of the plurality of reconstructed pixels. Further, the plurality of transform coefficients may be directly used, without any quantization, to compute the plurality of reconstructed coefficients.

In step 730, the decoder may compute a plurality of reconstructed coefficients (e.g., the reconstructed coefficients 406) as a sum of the plurality of decoded residual coefficients and the plurality of transform coefficients. In step 740, the decoder may dequantize the plurality of reconstructed coefficients to generate a plurality of dequantized coefficients (e.g., the dequantized coefficients 422).

In step 750, the decoder may generate a plurality of reconstructed pixels (e.g., the reconstructed pixels 432) by inverse transforming the plurality of dequantized coefficients. The plurality of reconstructed pixels represent a reconstructed version of a plurality of original pixels which have been transformed by a transform matrix in a video encoder (e.g., the encoder 300). In an embodiment, transforming the plurality of prediction pixels uses the same transform matrix as in the encoder.

In step 760, the decoder may filter the plurality of reconstructed pixels to generate a plurality of filtered pixels (e.g., the filtered pixels 452). Similar to FIG. 6, one of ordinary skill in the art will recognize that FIG. 7 illustrates only a portion of necessary steps in decoding video frames or blocks in a frame, thus the method 700 may include any other step as necessary to complete decoding.

Figure 8:
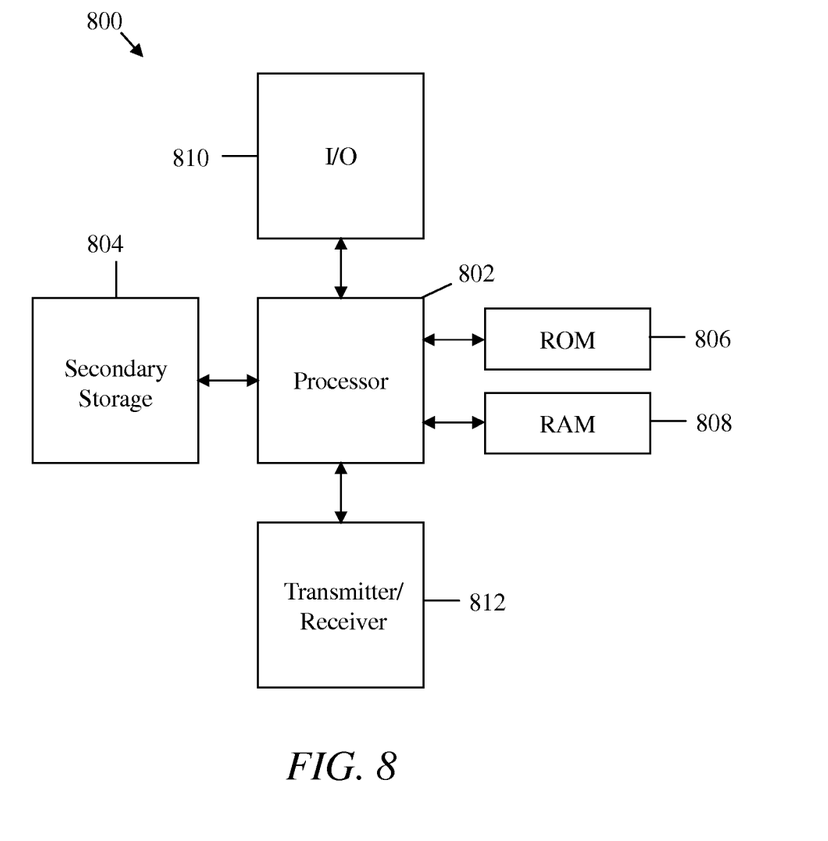
FIG. 8 is a schematic diagram of an embodiment of a network component.

The schemes described above may be implemented on a network component, such as a computer or network component with sufficient processing power, memory resources, and network throughput capability to handle the necessary workload placed upon it. FIG. 8 is a schematic diagram of an embodiment of a network component or node 800 suitable for implementing one or more embodiments of the video codecs or methods disclosed herein, such as the encoder 300, the decoder 400, the video encoding method 600, and the video decoding method 700. The network node 800 includes a processor 802 that is in communication with memory devices including secondary storage 804, read only memory (ROM) 806, random access memory (RAM) 808, input/output (I/O) devices 810, and transmitter/receiver (or transceiver) 812. The I/O devices 810 and/or the transmitter/receiver 812 may be optional and if not included the network node 800 becomes a computing device in which case an encoded bitstream or a decoded video stream may be stored in memory. The processor 802 may be implemented as one or more central processing unit (CPU) chips, cores (e.g., a multi-core processor), field-programmable gate arrays (FPGAs), application specific integrated circuits (ASICs), and/or digital signal processors (DSPs). The processor 802 may be implemented using hardware or a combination of hardware and software.

The secondary storage 804 typically comprises one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

The transmitter/receiver 812 may serve as an output and/or input device of the network node 800. For example, if the transmitter/receiver 812 is acting as a transmitter, it may transmit data out of the network node 800. If the transmitter/receiver 812 is acting as a receiver, it may receive data into the network node 800. The transmitter/receiver 812 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The transmitter/receiver 812 may provide an avenue for the processor 802 to communicate with an Internet or one or more intranets. If the network node 800 is acting as a video encoder, the processor 802 may encode a bitstream. The processor 802 may also packetize and encapsulate (i.e., format) the bitstream for transmission and provide the formatted bitstream to the transmitter/receiver 812. The transmitter/receiver 812 would then transmit the formatted bitstream.

I/O devices 810 may include a video monitor, liquid crystal display (LCD), touch screen display, or other type of video display for displaying video, and/or may include a video recording device for capturing video. I/O devices 810 may also include one or more keyboards, mice, or track balls, or other well-known input devices. If the network node 800 is acting as a video encoder, a video stream to be encoded may be provided by I/O devices 810 or may be provided in another manner. Similarly, if the network node 800 is acting as a video decoder, a video stream to be decoded may be received via the transmitter/receiver 812 or may be provided in another manner.

It is understood that by programming and/or loading executable instructions onto the network node 800, at least one of the processor 802, the secondary storage 804, the RAM 808, and the ROM 806 are changed, transforming the network node 800 in part into a particular machine or apparatus (e.g., a video codec having the functionality taught by the present disclosure). The executable instructions may be stored on the secondary storage 804, the ROM 806, and/or the RAM 808 and loaded into the processor 802 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method for video encoding comprising:
transforming a plurality of pixels to generate a first plurality of transform coefficients;
quantizing the first plurality of transform coefficients to generate a plurality of quantized transform coefficients;
computing a plurality of prediction pixels based on a plurality of reconstructed pixels which are prediction references for the plurality of pixels;

transforming the plurality of prediction pixels to generate a second plurality of transform coefficients;

computing a plurality of prediction residual coefficients as a difference between the plurality of quantized transform coefficients and the second plurality of transform coefficients, wherein the second plurality of transform coefficients are directly used, without any quantization, to compute the plurality of prediction residual coefficients; and entropy encoding the plurality of prediction residual coefficients to generate a plurality of encoded residual coefficients.

2. The method of claim 1, wherein transforming the plurality of pixels and transforming the plurality of prediction pixels use an identical transform matrix.

3. The method of claim 1, wherein the plurality of pixels are located in a video frame, and wherein a transform matrix used in transforming the plurality of pixels is selected to match content characteristics of the video frame.

4. The method of claim 1, wherein the plurality of reconstructed pixels are generated by inverse transforming a plurality of dequantized transform coefficients, and wherein the plurality of dequantized transform coefficients are generated by dequantizing another plurality of quantized transform coefficients that have been computed via quantization prior to transforming the plurality of pixels.

5. The method of claim 4, wherein the plurality of reconstructed pixels are filtered using one or more in-loop filters before being used as the prediction references, and wherein the one or more in-loop filters include at least one of a deblocking filter and a sample adaptive offset (SAO) filter.

6. The method of claim 4, wherein the plurality of pixels are located in a current frame, wherein the plurality of reconstructed pixels are located in a reference frame, and wherein computing the plurality of prediction pixels uses the reference frame for inter-frame prediction.

7. The method of claim 4, wherein the plurality of pixels are located in a current block, wherein the plurality of reconstructed pixels are located in a reference block that has been coded before the current block, and wherein computing the plurality of prediction pixels uses the reference block for intra-frame prediction and follows an intra prediction mode selected from a plurality of available intra prediction modes.

8. The method of claim 4, wherein a quantization noise is carried by the plurality of quantized transform coefficients that have been computed via quantization prior to transforming the plurality of pixels, and wherein the quantization noise has no impact on the quantization of the first plurality of transform coefficients.

9. An apparatus comprising:
a processor configured to:
  transform a pixel block comprising a plurality of pixels to generate a transform block comprising a plurality of transform coefficients;
  quantize the transform block to generate a quantized transform block comprising a plurality of quantized transform coefficients;
  compute a prediction block based on a set of reconstructed pixels that are prediction references for the pixel block;
  transform the prediction block to generate a transformed prediction block;
  compute a prediction residual block as a difference between the quantized transform block and the transformed prediction block, wherein the transformed prediction block is directly used, without any quantization, to compute the prediction residual block; and
  entropy encode the prediction residual block as a plurality of encoded residual coefficients.

10. The apparatus of claim 9, wherein transforming the pixel block and transforming the prediction block use an identical transform matrix.

11. The apparatus of claim 9, wherein the processor is further configured to:
  generate a dequantized transform block by dequantizing another quantized transform block that has been computed prior to transforming the pixel block; and
  generate a reconstructed block comprising the set of reconstructed pixels by inverse transforming the dequantized transform block.

12. The apparatus of claim 11, wherein the pixel block is located in a current frame, wherein the reconstructed block is located in a reference frame, and wherein the prediction block is computed based on motion compensation and using the reference frame.

13. The apparatus of claim 9, wherein a quantization noise is carried in the quantized transform block that has been computed prior to transforming the pixel block, and wherein the quantization noise has no impact on the quantization of the transform block.

14. A method for video decoding comprising:
  decoding a plurality of encoded residual coefficients to generate a plurality of decoded residual coefficients;
  transforming a plurality of prediction pixels to generate a plurality of transform coefficients;
  computing a plurality of reconstructed coefficients as a sum of the plurality of decoded residual coefficients and the plurality of transform coefficients, wherein the plurality of transform coefficients are directly used, without any quantization, to compute the plurality of reconstructed coefficients;
  generating a plurality of reconstructed pixels based on the plurality of reconstructed coefficients, wherein the plurality of prediction pixels are predicted versions of the plurality of reconstructed pixels; and
  filtering the plurality of reconstructed pixels to generate a plurality of filtered pixels.

15. The method of claim 14, further comprising:
  dequantizing the plurality of reconstructed coefficients to generate a plurality of dequantized coefficients,
  wherein the plurality of reconstructed pixels are generated by inverse transforming the plurality of dequantized coefficients.

16. The method of claim 14, wherein the plurality of reconstructed pixels represent a reconstructed version of a plurality of original pixels, wherein the plurality of original pixels have been transformed by a transform matrix in a video encoder, and wherein transforming the plurality of prediction pixels also uses the same transform matrix.

17. The method of claim 14, wherein the plurality of prediction pixels are generated via inter-frame prediction or intra-frame prediction based on a plurality of prediction reference pixels, and wherein the plurality of prediction reference pixels have been computed prior to decoding the plurality of encoded residual coefficients.

* * * * *